United States Patent
Nishiyama et al.

(10) Patent No.: US 9,564,647 B2
(45) Date of Patent: Feb. 7, 2017

(54) FUEL CELL SYSTEM

(75) Inventors: Tadashi Nishiyama, Sakura (JP); Hidehiko Takase, Utsunomiya (JP); Go Morimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 515 days.

(21) Appl. No.: 13/011,449

(22) Filed: Jan. 21, 2011

(65) Prior Publication Data

US 2011/0183226 A1 Jul. 28, 2011

(30) Foreign Application Priority Data

Jan. 22, 2010 (JP) ................................ 2010-012380

(51) Int. Cl.
| | |
|---|---|
| H01M 8/0438 | (2016.01) |
| H01M 8/04 | (2016.01) |
| H01M 12/08 | (2006.01) |
| B60K 1/04 | (2006.01) |
| H01M 8/10 | (2016.01) |

(52) U.S. Cl.
CPC ..... *H01M 8/04335* (2013.01); *H01M 8/04395* (2013.01); *H01M 8/04522* (2013.01); *H01M 12/08* (2013.01); *B60K 1/04* (2013.01); *H01M 2008/1095* (2013.01); *H01M 2250/20* (2013.01); *Y02E 60/50* (2013.01); *Y02T 90/32* (2013.01)

(58) Field of Classification Search
USPC ....................................................... 180/65.1
See application file for complete search history.

(56) References Cited

U.S. PATENT DOCUMENTS

| | | | |
|---|---|---|---|
| 6,586,128 B1 * | 7/2003 | Johnson et al. | .............. 429/444 |
| 7,695,845 B2 | 4/2010 | Sugita et al. | |
| 8,110,316 B2 | 2/2012 | Oda et al. | |
| 8,137,864 B2 | 3/2012 | Ishikawa et al. | |
| 8,177,003 B2 | 5/2012 | Shiomi et al. | |
| 8,802,312 B2 | 8/2014 | Sugita et al. | |

(Continued)

FOREIGN PATENT DOCUMENTS

| | | |
|---|---|---|
| CN | 101297426 | 10/2008 |
| CN | 101312250 A | 11/2008 |

(Continued)

OTHER PUBLICATIONS

Japanese Office Action for Application No. 2010-258440, 5 pages, dated Dec. 17, 2013.

(Continued)

*Primary Examiner* — Maria J Laios
(74) *Attorney, Agent, or Firm* — Nelson Mullins Riley & Scarborough LLP; Anthony A. Laurentano

(57) ABSTRACT

A fuel cell system includes a fuel cell stack and a mounting section. The fuel cell stack is mounted on the mounting section with inclination. The fuel cell stack is formed by stacking a plurality of fuel cells in a vertical direction. An oxygen-containing gas in an oxygen-containing gas flow field and a fuel gas in a fuel gas flow field flow in a counterflow manner. In a front box of a vehicle, an inlet side of the fuel gas flow field is positioned above an outlet side of the fuel gas flow field with respect to a horizontal direction. In this state, the fuel cell stack is mounted on the mounting section. The fuel cell stack is inclined downward from the horizontal direction toward the back of the vehicle in a vehicle length direction.

7 Claims, 16 Drawing Sheets

(56) References Cited

U.S. PATENT DOCUMENTS

| | | |
|---|---|---|
| 2003/0108784 A1 | 6/2003 | Enjoji et al. |
| 2006/0088752 A1* | 4/2006 | Sakano et al. ............... 429/34 |
| 2006/0110650 A1* | 5/2006 | Sugiura et al. ............... 429/38 |
| 2007/0111083 A1* | 5/2007 | Kikuchi ............ H01M 8/0256 |
| | | 429/414 |
| 2010/0183944 A1 | 7/2010 | Ogawa et al. |

FOREIGN PATENT DOCUMENTS

| | | |
|---|---|---|
| CN | 101335358 A | 12/2008 |
| CN | 101364648 A | 2/2009 |
| CN | 101364649 A | 2/2009 |
| JP | 2003-92130 | 3/2003 |
| JP | 2003-173790 | 6/2003 |
| JP | 2003-217621 | 7/2003 |
| JP | 2004-63173 | 2/2004 |
| JP | 2004-207106 | 7/2004 |
| JP | 2005-158339 | 6/2005 |
| JP | 2007-87739 | 4/2007 |
| JP | 2008-171808 | 7/2008 |
| JP | 2008-251204 | 10/2008 |
| JP | 2009-16139 | 1/2009 |
| JP | 2009-26519 | 2/2009 |

OTHER PUBLICATIONS

Chinese Office Action issued in Chinese Patent Application No. 201110030359.X dated Dec. 10, 2014.

Chinese Office Action for Application No. 201110030359.X, 10 pages, dated Jun. 9, 2014.

* cited by examiner

CONDENSED WATER ACCUMULATION MAP

LOAD

TEMPERATURE

INSTABILITY TABLE

FUEL CELL SYSTEM

CROSS-REFERENCE TO RELATED APPLICATION

This application is based upon and claims the benefit of priority from Japanese Patent Application No. 2010-012380 filed on Jan. 22, 2010, of which the contents are incorporated herein by reference.

BACKGROUND OF THE INVENTION

Field of the Invention

The present invention relates to a fuel cell system including a fuel cell stack formed by stacking a plurality of fuel cells and a mounting section for mounting the fuel cell stack on the mounting section with inclination from a horizontal direction.

Description of the Related Art

For example, a solid polymer electrolyte fuel cell employs an electrolyte membrane. The electrolyte membrane is a polymer ion exchange membrane, and interposed between an anode and a cathode to form a membrane electrode assembly (MEA). The membrane electrode assembly and a pair of separators sandwiching the membrane electrode assembly make up a power generation cell for generating electricity. In use, typically, a predetermined number (e.g., several hundreds) of the power generation cells are stacked together to form a fuel cell stack. For example, the fuel cell stack is mounted in a vehicle.

In the fuel cell, a fuel gas flow field (reactant gas flow field) for supplying a fuel gas is formed on a separator surface facing the anode, and an oxygen-containing gas flow field for supplying an oxygen-containing gas is formed on a separator surface facing the cathode.

In this system, water vapor is condensed into liquid water in the fuel gas flow field. Further, water is produced by power generation in the oxygen-containing gas flow field. The water tends to be retained in these flow fields. Thus, the fuel gas flow field and the oxygen-containing gas flow field may be clogged by the stagnant water retained in these flow fields. Under the circumstances, the fuel gas and the oxygen-containing gas may not be suitably supplied to the anode and cathode.

In this regard, for example, in a fuel cell disclosed in Japanese Laid-Open Patent Publication No. 2003-092130, as shown in FIG. 16, a cell assembly 2 formed by stacking a plurality of cells is provided in a body casing 1, and the body casing 1 is tiltable with respect to a reference plane h. An inlet port 3 for supplying a humidified gas to each gas flow field is formed at an upper position of the body casing 1, and a first outlet port 4 and a second outlet port 5 for the humidified gas discharged from the flow fields are formed at lower positions at both ends of the body casing 1.

When the body casing 1 is tilted with respect to the reference plane h, the water guided to a bottom surface 6 flows out of the second outlet port 5, and discharged to the outside of the body casing 1 through an open/close valve 7. According to the disclosure, no excessive water is retained in the gas flow field, and degradation of the power generation performance can be suppressed effectively.

In general, the fuel gas in the fuel gas flow field and the oxygen-containing gas in the oxygen-containing gas flow field flow in the same direction in a parallel manner or flow in the opposite directions in a counterflow manner. In the case where the fuel gas in the fuel gas flow field and the oxygen-containing gas in the oxygen-containing gas flow in a counterflow manner, the inlet and the outlet of the fuel gas flow field and the inlet and the outlet of the oxygen-containing gas field are provided opposite to each other. Specifically, the inlet of the fuel gas flow field and the outlet of the oxygen-containing gas flow field are disposed on the same side, and the outlet of the fuel gas flow field and the inlet of the oxygen-containing gas flow field are disposed on the same side.

In the structure, as in the case of Japanese Laid-Open Patent Publication No. 2003-092130, when the body casing 1 is tilted with respect to the reference plane h, water cannot be discharged smoothly from either the fuel gas flow field or the oxygen-containing gas flow field.

In particular, in the fuel gas flow field, in the case where pure hydrogen is used as a fuel gas, structure where a supply channel connected to the inlet side of the fuel gas flow field and a discharge channel connected to the outlet side of the fuel gas flow field are connected by an ejector is adopted to carry out supply of the fuel gas by circulation. In this type of the system, since the flow rate of the circulating fuel gas is not sufficient, the condensed water tends to be retained in the fuel gas flow field. Therefore, the flow resistance is increased by the retained condensed water, and the fuel gas is not sufficiently supplied to the reaction surface. Thus, stoichiometric ratio of the fuel gas is reduced, and the power generation performance is degraded. The stoichiometric ratio of the fuel gas is regarded as being lowered when the amount of fuel gas supplied becomes even smaller than the amount of fuel gas actually required.

Further, in the system where a pump for forcibly circulating hydrogen is provided, in order to solve this problem, a pump having good performance may be employed as the pump for forcibly circulating hydrogen. However, since the density of the hydrogen is small, the load on the pump becomes significantly high, and the efficiency in the overall system becomes very poor.

SUMMARY OF THE INVENTION

The present invention has been made to solve the above problem, and an object of the present invention is to provide a fuel cell system having simple structure in which it is possible to easily and reliably discharge stagnant water from reactant gas flow fields in the fuel cell stack.

A fuel cell system according to the present invention includes a fuel cell stack and a mounting section. The fuel cell stack is mounted on the mounting section.

The fuel cell stack is formed by stacking a plurality of fuel cells. Each of the fuel cells includes a membrane electrode assembly and a pair of separators sandwiching the membrane electrode assembly. The membrane electrode assembly includes a pair of electrodes and an electrolyte membrane interposed between the electrodes. A fuel gas flow field is formed between one of the electrodes and one of the separators for supplying a fuel gas along an electrode surface. An oxygen-containing gas flow field is formed between the other of the electrodes and the other of the separators for supplying an oxygen-containing gas along an electrode surface. The fuel gas in the fuel gas flow field and the oxygen-containing gas in the oxygen-containing gas flow field flow in a counterflow manner.

The mounting section is provided in a front box of a vehicle for mounting the fuel cell stack in a state where an inlet side of the fuel gas flow field is positioned above an outlet side of the fuel gas flow field with respect to the horizontal direction such that the fuel cell stack is inclined downward from the horizontal direction to the back of a vehicle length direction (traveling direction).

In the present invention, the inlet side of the fuel gas flow field is positioned above the outlet side of the fuel gas flow field with respect to the horizontal direction. In this state, the fuel cell stack is mounted on the mounting section with inclination. In the structure, the condensed water in the fuel gas flow field flows smoothly and reliably from the inlet side to the outlet side by gravity along inclination of the fuel gas flow field. Therefore, no stagnant water is retained in the fuel gas flow field. Thus, the stoichiometric ratio of the fuel gas (amount of fuel gas supplied/amount of fuel gas actually required) is not reduced, and the desired power generation can be maintained.

The flow rate of the oxygen-containing gas flowing through the oxygen-containing gas flow field such as the air is larger than the flow rate of the fuel gas flowing through the fuel gas flow field. Further, the viscosity and the density of the oxygen-containing gas are high. Therefore, the pressure difference between both sides (inlet side and the outlet side) of the oxygen-containing gas flow field is large. Thus, even if the inlet side of the oxygen-containing gas flow field is positioned below the outlet side of the oxygen-containing gas flow field, by utilizing the pressure difference, the water produced in the oxygen-containing gas flow field can flow smoothly and reliably from the inlet side to the outlet side. Therefore, no stagnant water is retained in the oxygen-containing gas flow field. Thus, the stoichiometric ratio of the oxygen-containing gas (amount of oxygen-containing gas supplied/amount of oxygen-containing gas actually required) is not reduced, and the desired power generation can be maintained.

Further, the fuel cell stack is provided in the front box of the vehicle with downward inclination from the horizontal direction to the back in the vehicle length direction. Therefore, in the front box, peripheral devices can be laid out in the compact spaces efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
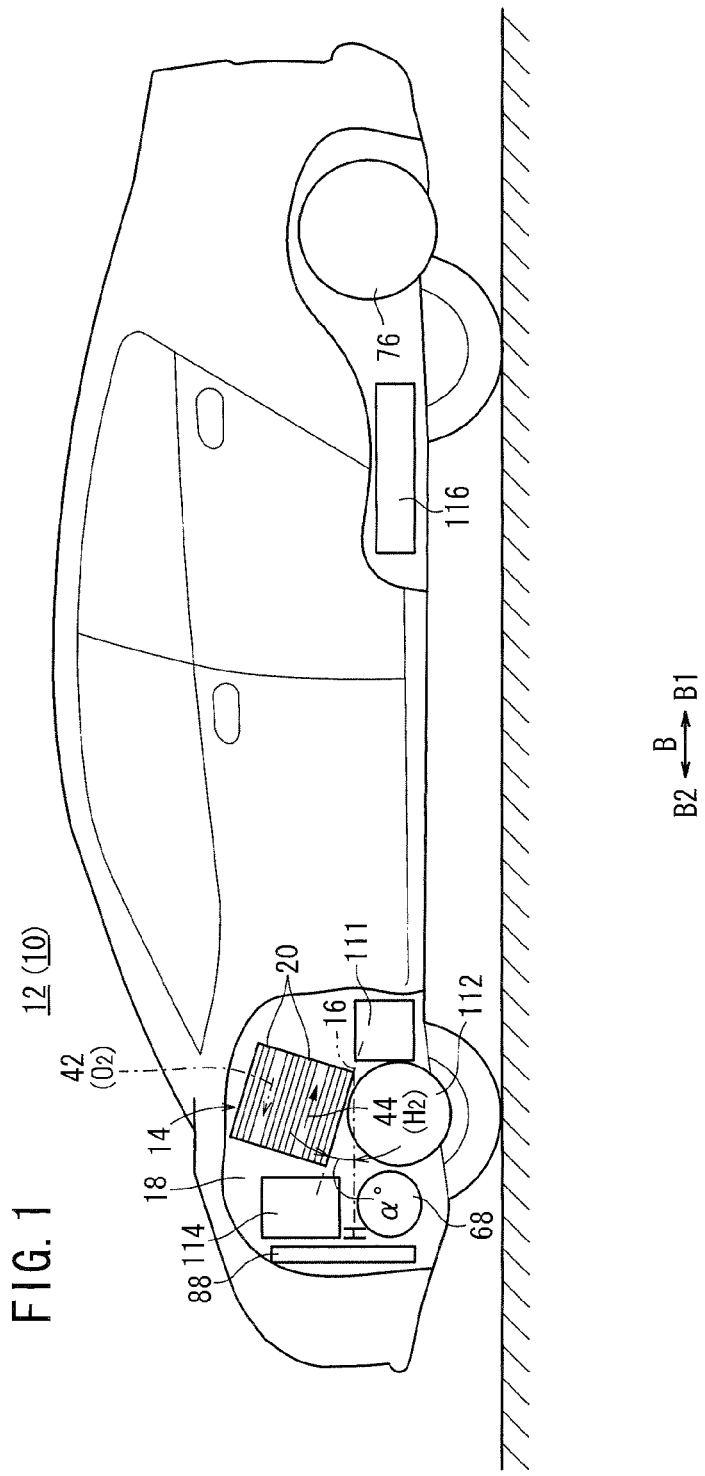
FIG. 1 is a view schematically showing a fuel cell vehicle including a fuel cell system according to a first embodiment of the present invention.

As shown in FIG. 1, a fuel cell system 10 according to a first embodiment of the present invention is incorporated in a fuel cell vehicle 12.

The fuel cell system 10 includes a fuel cell stack 14, and a mounting section 16 fixed to a vehicle body through a bracket (not shown). The fuel cell stack 14 is mounted on the mounting section 16 with inclination. The fuel cell stack 14 is placed in a front box 18 of the fuel cell vehicle 12, and the mounting section 16 is provided in the front box 18.

Figure 2:
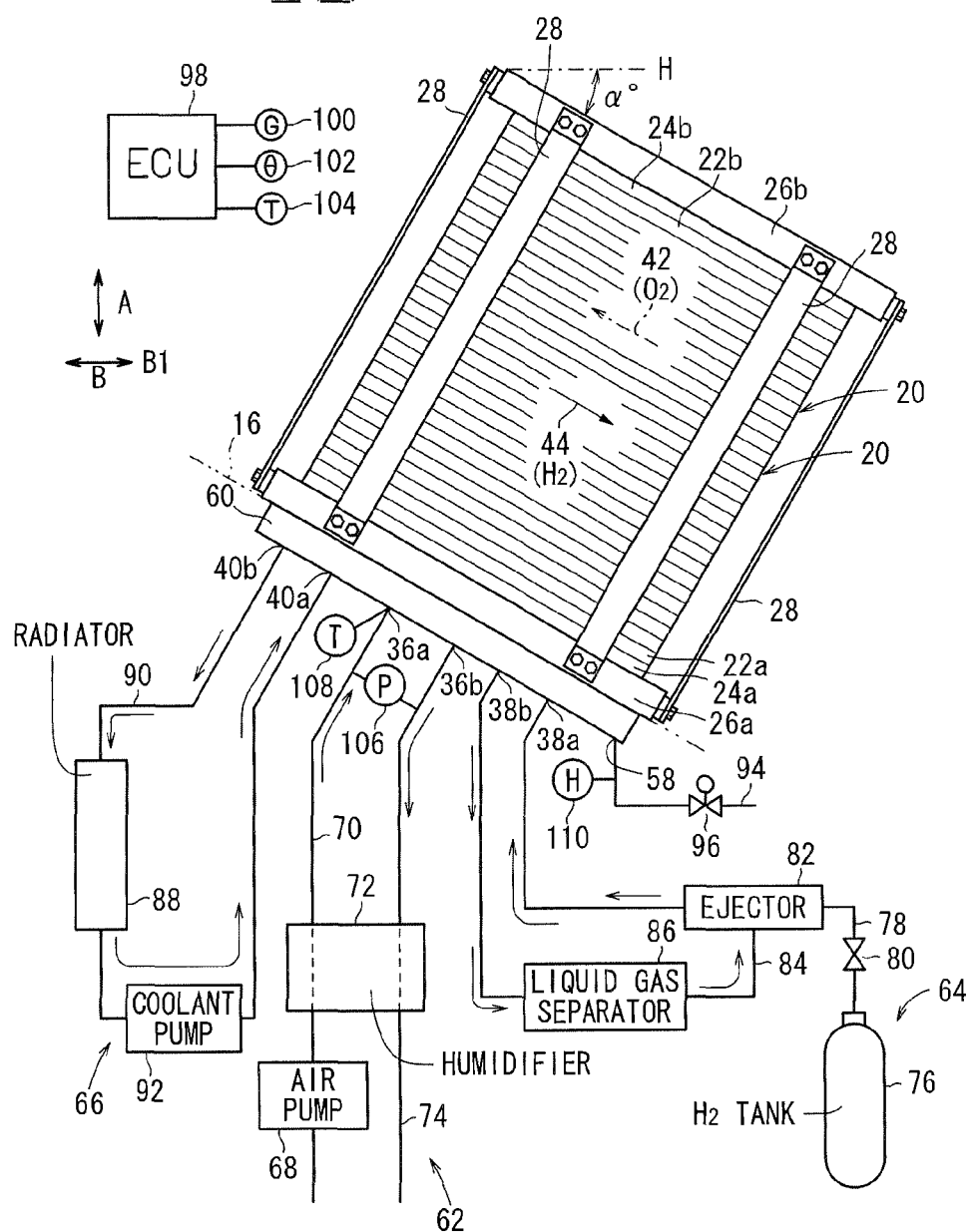
FIG. 2 is a view schematically showing structure of the fuel cell system.

As shown in FIG. 2, the fuel cell stack 14 includes a plurality of fuel cells 20, and the fuel cells 20 are stacked together in the vertical direction, and electrode surfaces of the fuel cell stack 14 are oriented in the horizontal direction.

The fuel cells 20 are inclined in the vertical direction indicated by an arrow A. At a lower end of the fuel cells 20 in the stacking direction, a terminal plate 22a, an insulating plate 24a, and an end plate 26a are provided.

At an upper end of the fuel cells 20 in the stacking direction, a terminal plate 22b, an insulating plate 24b, and an end plate 26b are provided.

Both ends of a plurality of coupling bars 28 are fixed to the end plates 26a, 26b, and a predetermined tightening load is applied to the components between the end plates 26a, 26b.

Figure 3:
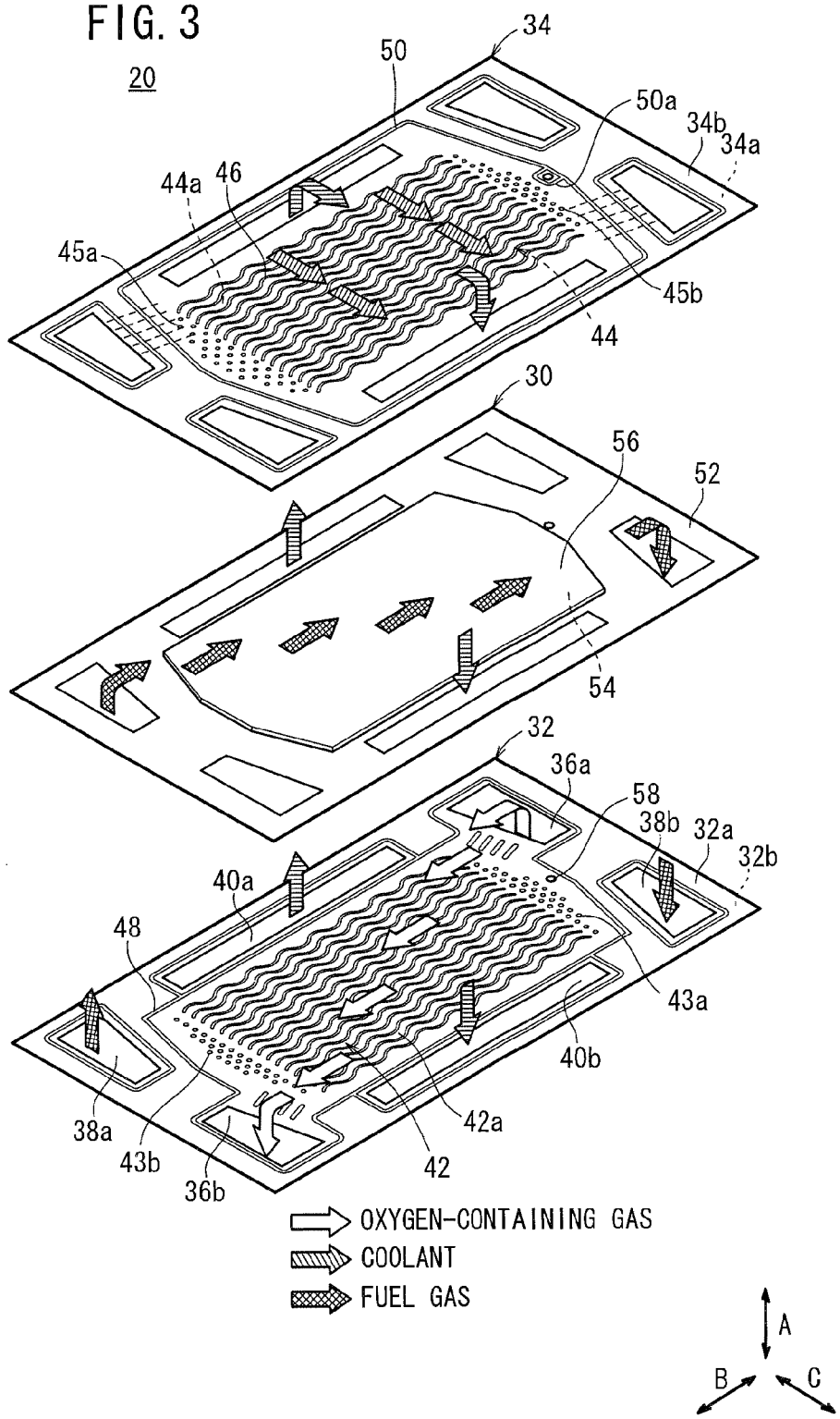
FIG. 3 is an exploded perspective view showing main components of a fuel cell of the fuel cell system.

As shown in FIG. 3, a membrane electrode assembly (MEA) 30 is sandwiched between first and second metal separators 32, 34. For example, the first metal separator 32 and the second metal separator 34 are steel plates, stainless steel plates, aluminum plates, plated steel sheets, or rectangular metal plates having anti-corrosive surfaces by surface treatment.

Each of the first and second metal separators 32, 34 has a rectangular shape in a plan view, and has a corrugated shape in cross section, by corrugating metal thin plates by pressure forming. Alternatively, instead of the first and second metal separators 32, 34, carbon separators (not shown) may be used.

At one end of the fuel cell 20 in a vehicle length direction indicated by an arrow B, an oxygen-containing gas supply passage 36a for supplying an oxygen-containing gas, and a fuel gas discharge passage 38b for discharging a fuel gas such as a hydrogen-containing gas are provided. The oxygen-containing gas supply passage 36a and the fuel gas discharge passage 38b extend through the fuel cell 20 in the stacking direction indicated by an arrow A.

At the other end of the fuel cell 20 in the direction indicated by the arrow B, a fuel gas supply passage 38a for supplying the fuel gas and an oxygen-containing gas discharge passage 36b for discharging the oxygen-containing gas are provided. The fuel gas supply passage 38a and the oxygen-containing gas discharge passage 36b extend through the fuel cell 20 in the stacking direction indicated by the arrow A.

At both ends of the fuel cell 20 in a vehicle width direction indicated by an arrow C, a coolant supply passage 40a for supplying a coolant and a coolant discharge passage 40b for discharging the coolant are provided. The coolant supply passage 40a and the coolant discharge passage 40b extend through the fuel cell 20 in the direction indicated by the arrow A.

The first metal separator 32 has an oxygen-containing gas flow field 42 on its surface 32a facing the membrane electrode assembly 30. The oxygen-containing gas flow field 42 is connected to the oxygen-containing gas supply passage 36a and the oxygen-containing gas discharge passage 36b. For example, the oxygen-containing gas flow field 42 includes a plurality of corrugated flow grooves 42a extending only in one direction indicated by the arrow B, without adopting gas flow grooves having turns in the flow field like a serpentine gas flow field. An inlet buffer 43a is provided upstream of the oxygen-containing gas flow field 42, and an outlet buffer 43b is provided downstream of the oxygen-containing gas flow field 42.

The second metal separator 34 has a fuel gas flow field 44 on its surface 34a facing the membrane electrode assembly 30. The fuel gas flow field 44 is connected to the fuel gas supply passage 38a and the fuel gas discharge passage 38b. The fuel gas flow field 44 also includes a plurality of corrugated flow grooves 42a extending in one direction indicated by the arrow B, in the same manner as the oxygen-containing gas flow field, without adopting gas flow grooves having turns in the flow field. An inlet buffer 45a is provided upstream of the oxygen-containing gas flow field 42, and an outlet buffer 45b is provided downstream of the oxygen-containing gas flow field 42. The fuel gas in the fuel gas flow field 44 and the oxygen-containing gas in the oxygen-containing gas flow field 42 flow oppositely in a counterflow manner. Specifically, the flow grooves in the fuel gas flow field 44 and the flow grooves in the oxygen-containing gas flow field 42 extend substantially in parallel to each other, and the flow directions of the gases flowing in the fuel gas flow field 44 and the oxygen-containing gas flow field 42 are opposite to each other. Alternatively, instead of the corrugated flow grooves 42a, 42b, straight flow grooves may be used as the flow grooves 42a, 42b.

A coolant flow field 46 is formed between a surface 32b of the first metal separator 32 and a surface 34b of the second metal separator 34 of the adjacent fuel cells 20. The coolant flow field 46 is connected to the coolant supply passage 40a and the coolant discharge passage 40b. The back surface of the oxygen-containing gas flow field 42 and the back surface of the fuel gas flow field 44 of the second metal separator 34 are overlapped with each other to form the coolant flow field 46.

A first seal member 48 is formed integrally with the surfaces 32a, 32b of the first metal separator 32. Alternatively, a member separate from the first metal separator 32 may be provided as the first seal member 48 provided on the surfaces 32a, 32b of the first metal separator 32. A second seal member 50 is formed integrally with the surfaces 34a, 34b of the second metal separator 34. Alternatively, a member separate from the second metal separator 34 may be provided as the second seal member 50 on the surfaces 34a, 34b of the second metal separator 34.

Each of the first and second seal members 48, 50 is made of seal material, cushion material, or packing material such as an EPDM rubber (ethylene propylene diene monomer rubber), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

The membrane electrode assembly 30 includes a cathode 54, an anode 56, and a solid polymer electrolyte membrane 52 interposed between the cathode 54 and the anode 56. The solid polymer electrolyte membrane 52 is formed by impregnating a thin membrane of perfluorosulfonic acid with water, for example.

Each of the cathode 54 and the anode 56 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 54 and the electrode catalyst layer of the anode 56 are fixed to both surfaces of the solid polymer electrolyte membrane 52, respectively.

In the fuel cell 20, a water drainage passage 58 extends through an inlet buffer 43a provided at the inlet of the oxygen-containing gas flow field 42. The water drainage passage 58 extends through the solid polymer electrolyte membrane 52 and the second metal separator 34. A seal section 50a is provided on both surfaces of the second metal separator 34 around the water drainage passage 58.

As shown in FIG. 2, a pipe manifold 60 is attached to the end plate 26a. The pipe manifold 60 includes a plurality of independent manifold members connected respectively to the oxygen-containing gas supply passage 36a, the fuel gas supply passage 38a, the coolant supply passage 40a, the oxygen-containing gas discharge passage 36b, the fuel gas discharge passage 38b, and the coolant discharge passage 40b. In FIG. 2, details of the manifold members are not shown.

The fuel cell stack 14 is connected to an air supply apparatus 62 for supplying the air as an oxygen-containing gas, a hydrogen supply apparatus 64 for supplying a hydrogen gas as a fuel gas, and a coolant supply apparatus 66 for supplying a coolant.

The air supply apparatus 62 includes an air pump 68 connected to an air supply channel 70. The air supply channel 70 is connected to the oxygen-containing gas supply passage 36a of the fuel cell stack 14 through a humidifier 72.

The air supply apparatus 62 has an air discharge channel 74 connected to the oxygen-containing gas discharge passage 36b of the fuel cell stack 14, and the air discharge channel 74 extends to the outside of the vehicle through the humidifier 72. In the humidifier 72, water exchange is performed between the humidified air, which has flowed through the fuel cell stack 14 and discharged to the air discharge channel 74, and a fresh air supplied into the air supply channel 70, so as to humidify the fresh air.

The hydrogen supply apparatus 64 includes a hydrogen tank 76 storing high pressure hydrogen, and the hydrogen tank 76 is provided in the hydrogen supply channel 78. The hydrogen supply channel 78 is connected to the fuel gas supply passage 38a of the fuel cell stack 14. A pressure reducing valve 80 and an ejector 82 are provided in the hydrogen supply channel 78. A hydrogen discharge channel 84 is connected to a suction port of the ejector 82. The hydrogen discharge channel 84 is connected to the fuel gas discharge passage 38b of the fuel cell stack 14 through a gas liquid separator 86.

The coolant supply apparatus 66 has a radiator 88. The radiator 88 is connected to a coolant circulation channel 90, and both ends of the coolant circulation channel 90 are connected to the coolant supply passage 40a and the coolant discharge passage 40b. A coolant pump 92 is disposed in the coolant circulation channel 90.

The fuel cell stack 14 is connected to a drainage pipe 94. The drainage pipe 94 is connected to the water drainage passage 58, and extends to the outside. A solenoid valve (open/close valve) 96 is disposed in the drainage pipe 94.

The fuel cell system 10 is controlled by an ECU 98. The ECU 98 is connected to a G sensor 100 for detecting acceleration/deceleration applied to the vehicle body, an inclination angle sensor 102 for detecting the inclination angle of the vehicle body, and a temperature sensor 104 for detecting the ambient temperature around the fuel cell stack 14 or the outdoor air temperature.

As necessary, the air supply apparatus 62 includes a differential pressure sensor 106 for detecting a difference between the pressure in the oxygen-containing gas supply passage 36a and the pressure in the oxygen-containing gas discharge passage 36b, a temperature sensor 108 for detecting a temperature of the oxygen-containing gas supply passage 36a, and a water level sensor (detection means for detecting the amount of condensed water) 110 for detecting a water level in the water drainage passage 58. The differential pressure sensor 106, the temperature sensor 108, and the water level sensor 110 are connected to the ECU 98.

The G sensor 100 is positioned adjacent to the fuel cell stack 14, and fixed to the vehicle body. The G sensor 100 detects acceleration/deceleration in a direction parallel to the flow direction of the fuel gas in the fuel gas flow field 44.

The flow direction of the fuel gas is the front-back (vehicle length) direction of the fuel cell vehicle 12 indicated by the arrow B in FIG. 1. Therefore, G may be calculated in the ECU 98 based on data supplied from the vehicle velocity sensor instead of using the G sensor 100. Alternatively, G may be determined based on the depression amount of the brake pedal or the acceleration pedal.

For example, the inclination angle sensor 102 is a pendulum sensor (e.g., a hall element sensor, a resistor sensor, a mechanical sensor, a gyro sensor, or a car navigator), and fixed to the vehicle body. The rotation plane of the inclination angle sensor 102 is in parallel to the flow direction of the fuel gas flow field 44.

For example, the water level sensor 110 is a float sensor (e.g., an optical sensor, a mechanical sensor). The water level sensor 110 is provided in the fuel cell stack 14, or provided at the pipe manifold 60, the drainage pipe 94, or a hole or the like connected to the drainage pipe 94.

As shown in FIGS. 1 and 2, the fuel cell stack 14 is inclined at an angle α°. The angle α° is in a range of 4° to 90°, preferably in a range of 20° to 80°, more preferably, in a range of 30° to 70°.

As shown in FIG. 1, in the front box 18 of the fuel cell vehicle 12, components other than the fuel cell stack 14 such as the radiator 88, the air pump 68, various auxiliary devices 111 (including the humidifier 72), a traction motor 112, and an air conditioner 114 are provided. The traction motor 112 is operated by electricity outputted from the fuel cell stack 14.

The hydrogen tank 76 is provided on the back side of the fuel cell vehicle 12, and a battery 116 is provided in front of the hydrogen tank 76. Electricity is supplied from the battery 116 to the traction motor 112, in addition to the auxiliary devices 111 and the air conditioner 114. Electricity from the fuel cell stack 14 is charged in the battery 116.

The traction motor 112 is disposed below the fuel cell stack 14. An air pump 68 is provided in front of the traction motor 112, and the various auxiliary devices 111 are provided at the rear of the traction motor 112. An air conditioner 114 is provided above and near the air pump 68. The radiator 88 is provided in front of and near the air pump 68 and the air conditioner 114.

Operation of the fuel cell system 10 will be described below.

Firstly, when an ignition switch (not shown) of the fuel cell vehicle 12 is turned on, electricity from the battery 116 is supplied to the auxiliary devices 111 or the like, and operation of the fuel cell stack 14 is started.

As shown in FIG. 2, in the air supply apparatus 62, by operation of the air pump 68, the compressed air is introduced into the air supply channel 70 and humidified by the humidifier 72, and then, supplied to the oxygen-containing gas supply passage 36a of the fuel cell stack 14.

The hydrogen stored under high pressure in the hydrogen tank 76 is depressurized by the pressure reducing valve 80, and then, supplied to the hydrogen supply channel 78. Fuel gas (hydrogen) is ejected from a nozzle of the ejector 82, and the unconsumed fuel gas as described later is sucked both to be supplied into the fuel gas supply passage 38a of the fuel cell stack 14.

In the meanwhile, in the coolant supply apparatus 66, by operation of the coolant pump 92, the coolant is supplied from the coolant circulation channel 90 to the coolant supply passage 40a of the fuel cell stack 14.

In the structure, as shown in FIG. 3, the oxygen-containing gas is supplied from the oxygen-containing gas supply passage 36a into the oxygen-containing gas flow field 42 of the first metal separator 32. The oxygen-containing gas moves along the oxygen-containing gas flow field 42 in the direction indicated by the arrow B, and the oxygen-containing gas is supplied to the cathode 54 of the membrane electrode assembly 30 for inducing an electrochemical reaction at the cathode 54.

The fuel gas is supplied from the fuel gas supply passage 38a to the fuel gas flow field 44 of the second metal separator 34, and the fuel gas is supplied to the anode 56 of the membrane electrode assembly 30 for inducing an electrochemical reaction at the anode 56.

Thus, in the membrane electrode assembly 30, the oxygen-containing gas supplied to the cathode 54 and the fuel gas supplied to the anode 56 are consumed in the electrochemical reactions at catalyst layers of the cathode 54 and the anode 56 for generating electricity.

Then, the oxygen-containing gas that has been supplied to the cathode 54 but unconsumed moves along the oxygen-containing gas discharge passage 36b in the direction indicated by the arrow A, and the oxygen-containing gas is discharged into the air discharge channel 74 (see FIG. 2). After the unconsumed oxygen-containing gas humidifies newly supplied oxygen-containing gas at the humidifier 72, the unconsumed oxygen-containing gas is discharged to the outside of the vehicle.

The fuel gas that has been supplied to the anode 56 but unconsumed moves along the fuel gas discharge passage 38b in the direction indicated by the arrow A, and the fuel gas is discharged into the hydrogen discharge channel 84 (see FIG. 2). By sucking action of the ejector 82, the unconsumed fuel gas is mixed with fresh fuel gas, and flows into the hydrogen supply channel 78. The mixed fuel gas is supplied to the fuel cell stack 14.

Further, as shown in FIG. 3, the coolant (pure water, ethylene glycol, or oil) supplied to the coolant supply passage 40a flows into the coolant flow field 46 between the first and second metal separators 32, 34, and flows in the direction indicated by the arrow C. After the coolant cools the membrane electrode assembly 30, the coolant is discharged into the coolant discharge passage 40b. As shown in FIG. 2, the coolant is returned to the coolant circulation channel 90, and cooled by the radiator 88. Then, the coolant is supplied to the fuel cell stack 14 by circulation.

In the first embodiment, as shown in FIGS. 1 and 2, the fuel cell stack 14 is inclined downward at an angle of α° from a horizontal reference line H to the back in the vehicle length direction indicated by the arrow A. The inlet side of the fuel gas flow field 44 (the side where the fuel gas supply passage 38a is formed) is positioned above the outlet side of the fuel gas flow field 44 (the side where the fuel gas discharge passage 38b is provided) with respect to the horizontal direction.

In the structure, the condensed water remaining in the fuel gas flow field 44 is discharged smoothly and reliably by gravity from the inlet side to the outlet side by inclination of the fuel gas flow field 44. Therefore, no stagnant water remains in the fuel gas flow field 44.

Figure 4:
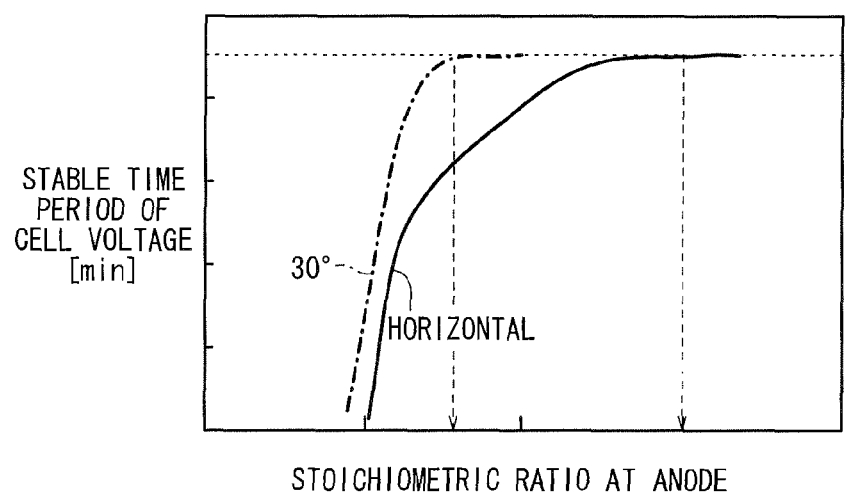
FIG. 4 is a graph showing the relationship between the stoichiometric ratio of a fuel gas and the inclination angle.

Specifically, as shown in FIG. 4, in the case where the grooves of the fuel gas flow field 44 are formed in parallel in the horizontal direction, if the stoichiometric ratio of the fuel gas is reduced, the period of time for which the cell voltage can be maintained stably becomes significantly small, and the stability in power generation becomes poor. In contrast, in the first embodiment, even if the stoichiometric ratio of the fuel gas is reduced, the period of time for which the cell voltage can be stabilized does not become small owing to downward inclination of the fuel gas flow field 44 at 30° from the inlet side to the outlet side, and the desired power generation is maintained advantageously.

In the oxygen-containing gas flow field 42, the inlet side (the side where the oxygen-containing gas supply passage 36a is provided) is positioned below the outlet side (the side where the oxygen-containing gas discharge passage 36b is provided) with respect to the horizontal direction. The flow rate of the oxygen-containing gas flowing through the oxygen-containing gas flow field 42 is larger than the flow rate of the fuel gas flowing through the fuel gas flow field 44. Further, viscosity and density of the oxygen-containing gas are high. Accordingly, the pressure difference between both ends of the oxygen-containing gas flow field 42 is large.

Figure 5:
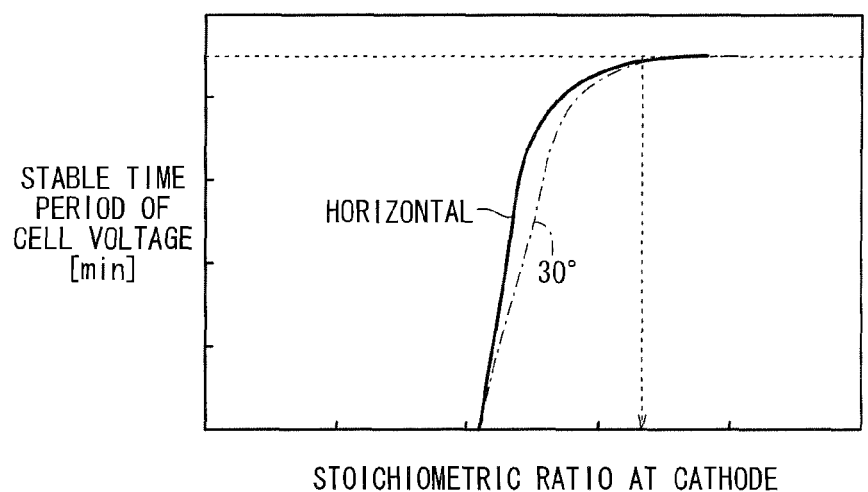
FIG. 5 is a graph showing the relationship between the stoichiometric ratio of an oxygen-containing gas and the inclination angle.

Thus, even if the inlet side of the oxygen-containing gas flow field 42 is positioned below the outlet side of the oxygen-containing gas flow field 42, using the pressure difference, the water produced in the oxygen-containing gas flow field 42 can be discharged from the inlet side to the outlet side smoothly and reliably. That is, as shown in FIG. 5, even if the inlet side of the oxygen-containing gas flow field 42 is inclined downward at 30° from the outlet side to the inlet side of the oxygen-containing gas flow field 42, the same stoichiometric ratio as in the case where the inlet side of the oxygen-containing gas flow field 42 and the outlet side of the oxygen-containing gas flow field 42 are provided horizontally can be maintained, and the power generation can be performed desirably.

Further, for removing condensed water from the oxygen-containing gas flow field 42 at the time of stopping operation of the fuel cell system 10, purging is performed by supplying a large amount of the air to flow through the oxygen-containing gas flow field 42. After purging, when the operation of the fuel cell system 10 is stopped, some of the condensed water remaining in the outlet side of the oxygen-containing gas flow field 42 is returned to the inlet side of the oxygen-containing gas flow field 42 little by little by gravity over a long period of time by inclination of the oxygen-containing gas flow field 42. When the operation of the fuel cell system 10 is stopped, the atmosphere on the inlet side of the oxygen-containing gas flow field 42 changes from the dried state to the wet state, and the solid polymer electrolyte membrane 52 is maintained to contain suitable water. Therefore, immediately after starting operation of the fuel cell stack 14, it becomes possible to maintain the desired power generation performance.

Moreover, the flow direction of the fuel gas in the fuel gas flow field 44 is opposite to the flow direction of the oxygen-containing gas in the oxygen-containing gas flow field 42 in a counterflow manner. In the structure, the condensed water tends to move from the outlet side of the fuel gas flow field 44 to the inlet side of the oxygen-containing gas flow field 42 easily through the electrolyte membrane 52, and the desired humidified state is maintained from the inlet side of the oxygen-containing gas flow field 42. Thus, in the air supply apparatus 62, the humidifier 72 does not become essential, or size reduction of the humidifier 72 is achieved.

Further, in the first embodiment, the back side of the fuel cell stack 14 is inclined downward to the rear in the vehicle length direction. In the structure, if acceleration (G) at the time of starting movement of the fuel cell vehicle 12 is generated, G is applied to the fuel cell stack 14 to the back of the vehicle length direction indicated by the arrow B1. Thus, in the fuel gas flow field 44 of the fuel cell stack 14, by acceleration, the condensed water remaining in the fuel gas flow field 44 is discharged smoothly. Thus, the process of discharging water is carried out desirably.

Further, in the first embodiment, as shown in FIGS. 2 and 3, at the inlet of the oxygen-containing gas flow field 42, the water drainage passage 58 is formed in correspondence with the inlet buffer 43a, and the water drainage passage 58 is connected to the drainage pipe 94 extending to the outside of the fuel cell stack 14. The solenoid valve 96 is provided in the drainage pipe 94.

The water level sensor 110 detects the water level of the condensed water present on the inlet side of the oxygen-containing gas flow field 42. When it is determined that the detected water level is a predetermined level or more, the ECU 98 opens the solenoid valve 96. Therefore, the condensed water remaining in the water drainage passage 58 is discharged smoothly from the drainage pipe 94.

Further, the G sensor 100, the inclination angle sensor 102, and the differential pressure sensor 106 are connected to the ECU 98. Therefore, in the event that a value which may affect the water drainage performance is continuously detected for a predetermined period of time by at least any of the G sensor 100, the inclination angle sensor 102, and the differential pressure sensor 106, before the output voltage of the fuel cell stack 14 is decreased, the stoichiometric ratio of the oxygen-containing gas is increased for a predetermined period of time or the load is increased so as to maintain the stable operation.

Next, control of opening the solenoid valve 96 disposed in the drainage pipe 94 will be described below.

Firstly, as means for detecting the water level to open the solenoid valve 96, at least one of the water level sensor 110, the differential pressure sensor 106, and the electric potential sensor (not shown) of the fuel cell 20 is used.

Then, when the condensed water in the predetermined water level or more is detected by the water level sensor 110, the differential pressure of the predetermined value or more is detected by the differential pressure sensor 106, or the electric potential of the predetermined value or less is detected, the ECU 98 determines that condensed water in excess of the allowable amount is present in the water drainage passage 58, and the solenoid valve 96 is opened for a predetermined period of time.

Figure 6:
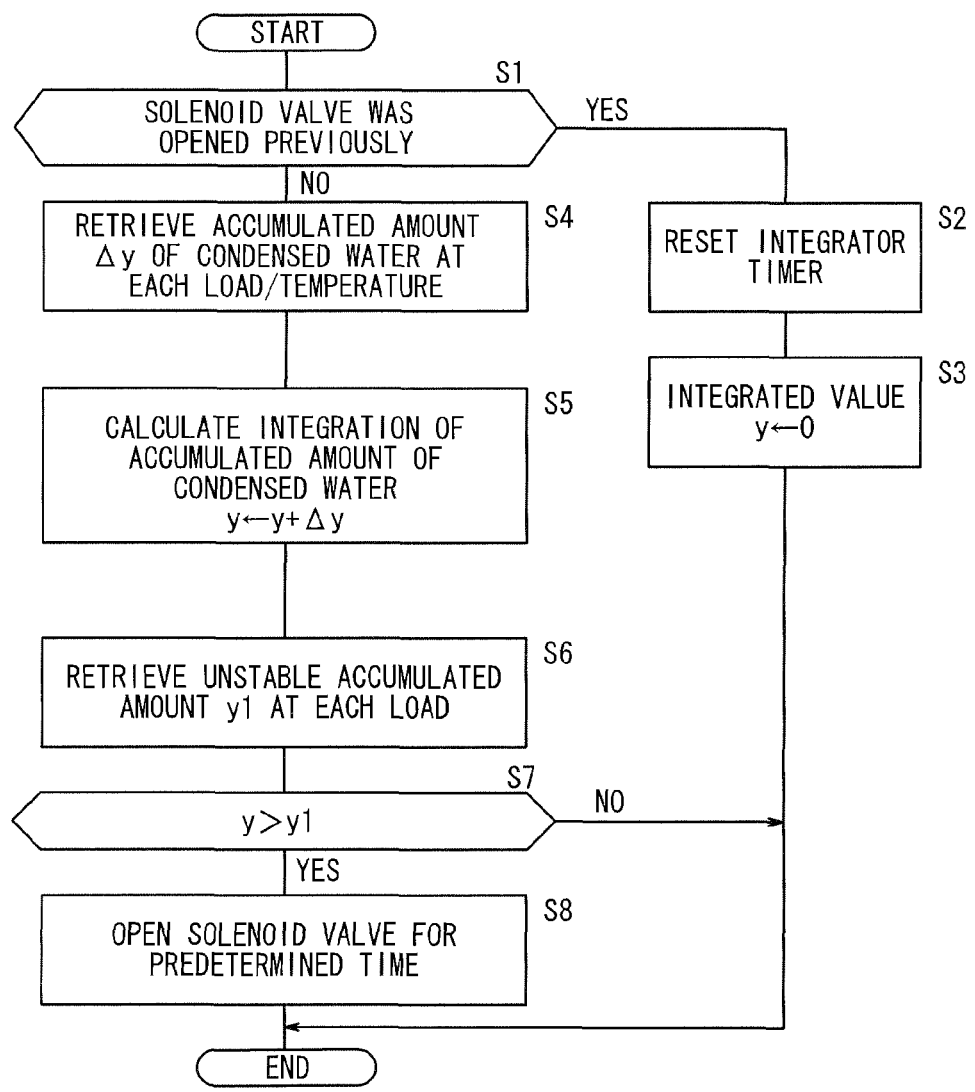
FIG. 6 is a flow chart showing a water drainage process.

The control of opening the solenoid valve 96 can be implemented without using the above types of sensors. This case will be described with reference to a flow chart shown in FIG. 6.

Figure 7:
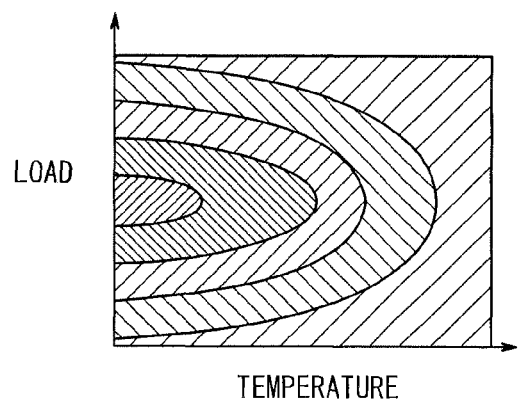
FIG. 7 is a view showing a condensed-water accumulating map.
Figure 8:
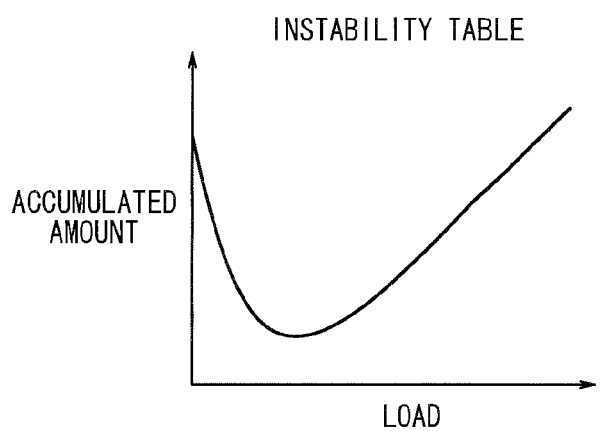
FIG. 8 is a graph showing an instability table based on the load and the accumulated amount.

A map showing the accumulated amount of the condensed water based on the relationship between the outdoor temperature and the operation load has been obtained experimentally as shown in FIG. 7. Further, in FIG. 8, the relationship between the operation load and the unstable accumulated amount is shown as an instability table.

Firstly, it is determined whether or not the solenoid valve 96 has been opened in the previous process. If it is determined that the solenoid valve 96 was opened (YES in step S1), the routine proceeds to step S2 for resetting an integrator timer, and an integrated value of the duration of operation is changed to "0" (step S3).

If it is determined that the solenoid valve 96 has not been opened in the previous process (NO in step S1), the routine proceeds to step S4 for retrieving the accumulated amount Δy of the condensed water in each load and temperature based on the map showing the accumulated amount of the condensed water in FIG. 7. Then, in step S5, the integrated value y of the accumulated amount of the condensed water is integrated by integration of the duration of operation, and the unstable accumulated amount in each load is retrieved based on the instability table in FIG. 8 (step S6). Then, the routine proceeds to step S7. If it is determined that the integrated value y exceeds the unstable accumulated amount y1 (YES in step S7), the routine proceeds to step S8 for opening the solenoid valve 96 for a predetermined period of time.

Thus, without using any sensors, control of opening the solenoid valve 96 is implemented reliably, and the process of discharging the water from the drainage pipe 94 is performed simply and economically.

Figure 9:
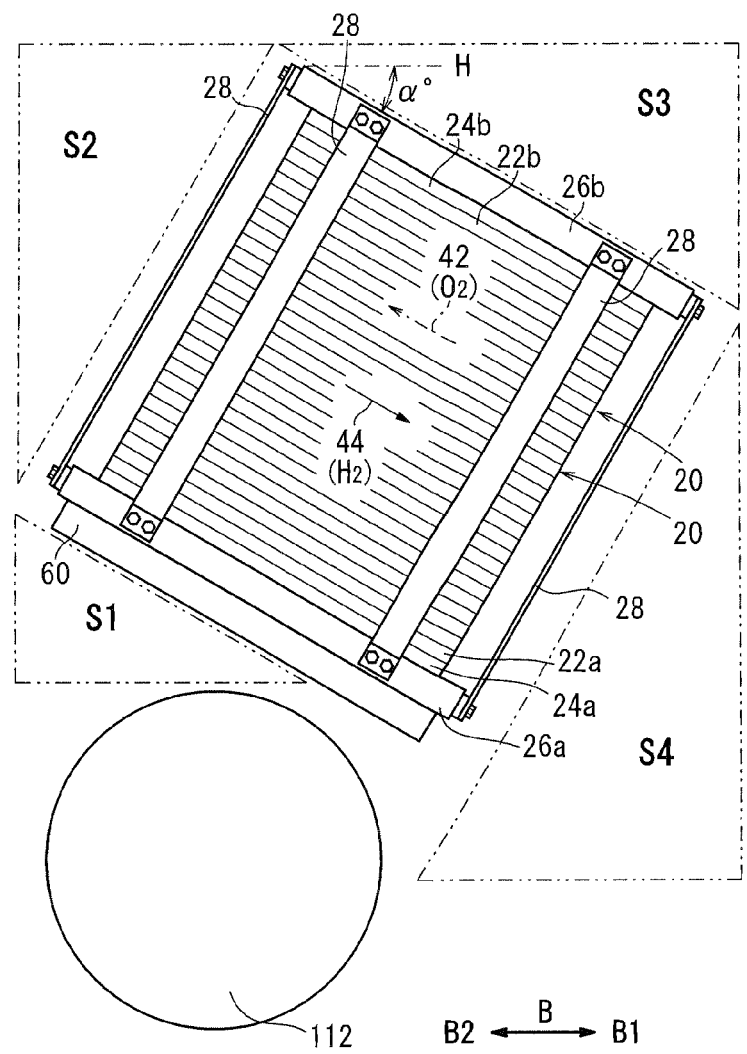
FIG. 9 is a view showing spaces for providing the fuel cell system.

Moreover, in the first embodiment, as shown in FIG. 9, the rear end of the fuel cell stack 14 is inclined downward at an angle of α° to the rear in the vehicle length direction. In the structure, spaces S1, S2, S3, and S4 are provided around the fuel cell stack 14.

The space S1 is an area in front of the fuel cell stack 14. Devices for the air supply system such as the humidifier 72 and the solenoid valve 96 may be provided in the space S1. The space S2 is an upper area in front of the fuel cell stack 14. For example, the space S2 functions as a crash space for providing clearance with a bonnet.

Further, the space S3 is an upper area on the back side of the fuel cell stack 14. For example, devices as electrical components and systems such as the ECU 98 may be placed in the space S3. The space S4 is a lower area on the back side of the fuel cell stack 14. For example, devices for the hydrogen system such as the gas liquid separator 86 and the ejector 82 may be provided in the space S4. Thus, in the front box 18 of the fuel cell vehicle 12, peripheral devices can laid out in the compact spaces efficiently.

Figure 10:
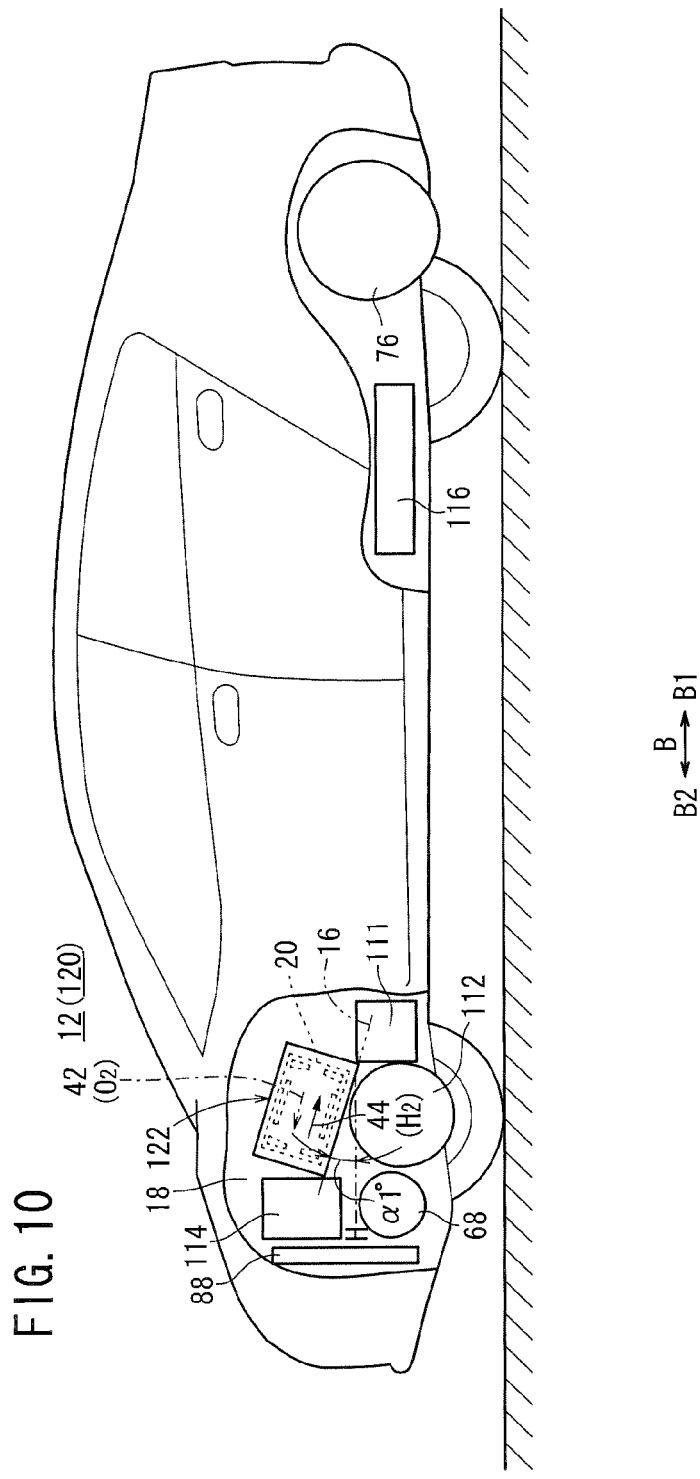
FIG. 10 is a view schematically showing a fuel cell vehicle equipped with a fuel cell system according to a second embodiment of the present invention.

FIG. 10 is a view schematically showing a fuel cell vehicle 12 including a fuel cell system 120 according to a second embodiment of the present invention. The constituent elements that are identical to those of the fuel cell system 10 according to the first embodiment are labeled with the same reference numerals, and description thereof is omitted.

Figure 11:
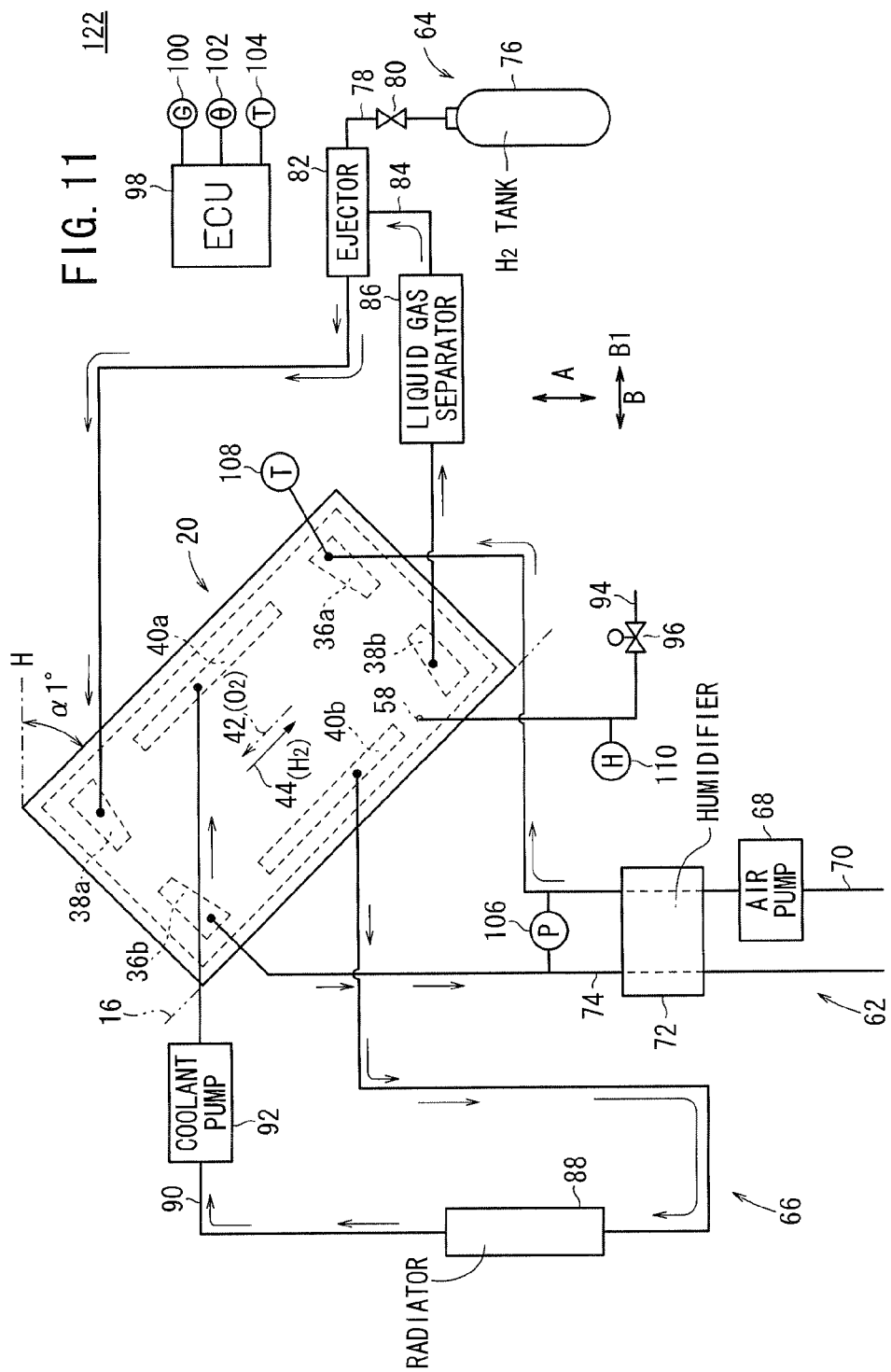
FIG. 11 is a diagram schematically showing structure of the fuel cell system.

The fuel cell system 120 includes a fuel cell stack 122. The fuel cell stack 122 is formed by stacking a plurality of fuel cells 20 in a horizontal direction such that the electrode surfaces of the fuel cells 20 are oriented in a vertical direction (see FIGS. 10 and 11).

Figure 12:
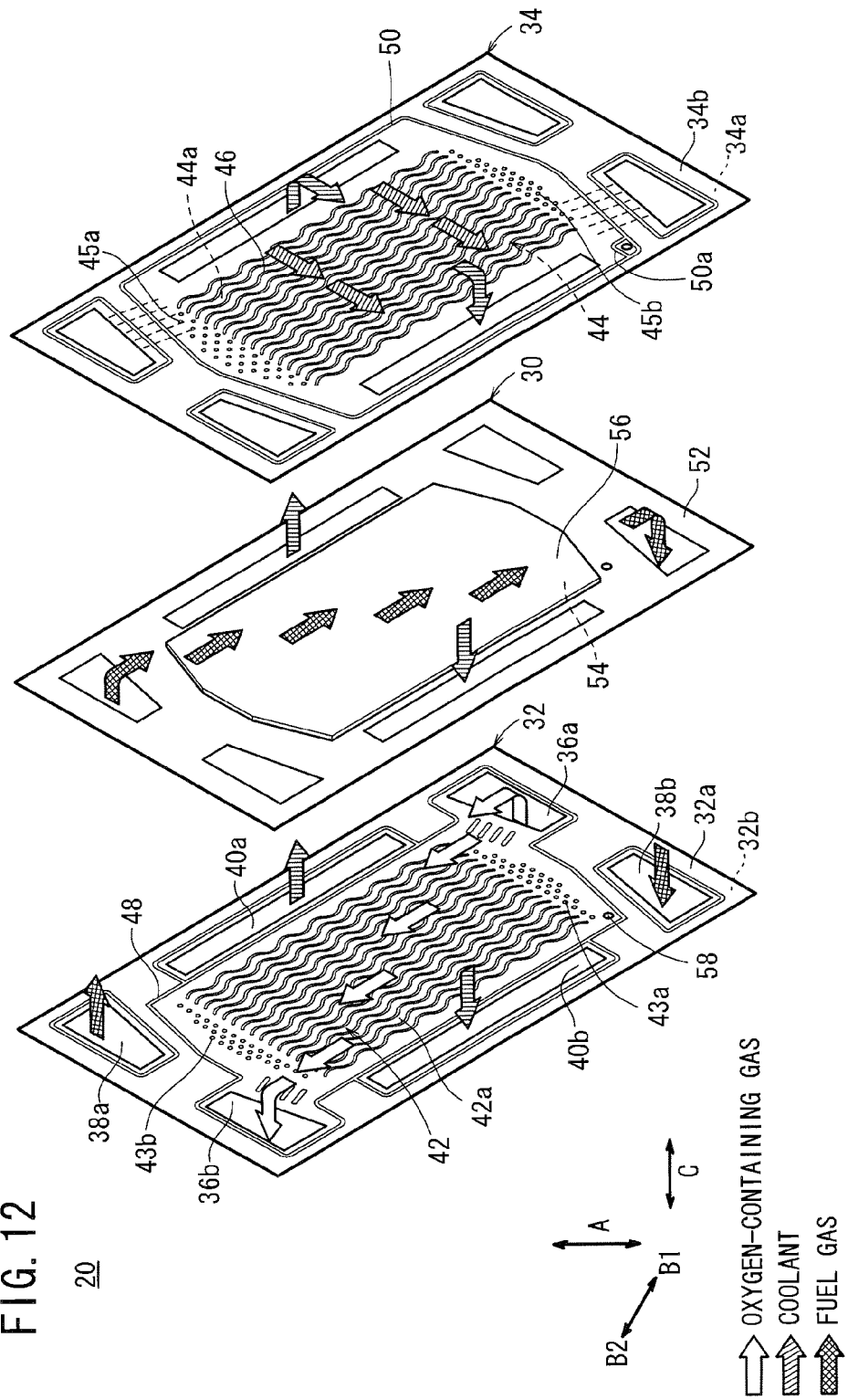
FIG. 12 is an exploded perspective view showing a fuel cell of the fuel cell system.

As shown in FIG. 12, the fuel cell 20 includes a first metal separator 32, a membrane electrode assembly 30, and a second metal separator 34 are oriented in the vertical direction, and stacked in a vehicle width direction indicated by an arrow C. One end of each of the fuel cells 20 in the vehicle length direction indicated by the arrow B is inclined downward such that the fuel gas supply passage 38a is provided at the uppermost position in the direction of the gravity, and the fuel gas discharge passage 38b is provided at the lowermost position in the direction of gravity.

In the second embodiment, the water drainage passage 58 of the fuel cell 20 is provided on the lower side in the direction of gravity, in the width direction (short side direction).

Figure 13:
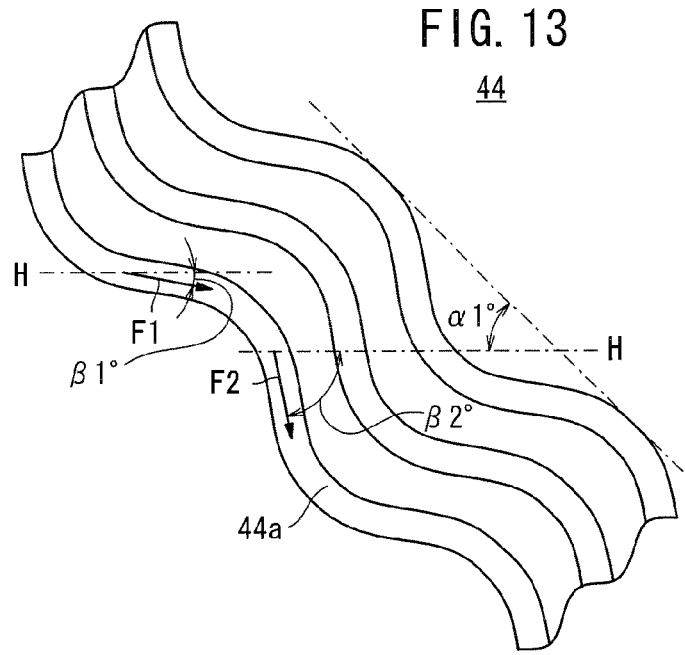
FIG. 13 is a view showing an inclination angle of a fuel gas flow field of the fuel cell.

In each fuel cell 20, as shown in FIG. 13, all of the flow directions F1, F2 of the fuel gas along central lines of the corrugated flow grooves 44a of the fuel gas flow field 44 are inclined downward from a horizontal reference line H (horizontal direction) at angles of 0° or more (angles β° and β°). In this state, the fuel cell 20 is inclined from the horizontal reference line H at angle α1°. Specifically, the angle α1° is in a range of 20° to 90°, and preferably, in a range of 35° to 80°, and more preferably, in a range of 45° to 70°. The flow direction of the oxygen-containing gas flow field 42 is opposite to the flow direction of the fuel gas in a counterflow manner, at the same angle as in the case of the fuel gas flow field 44.

Figure 14:
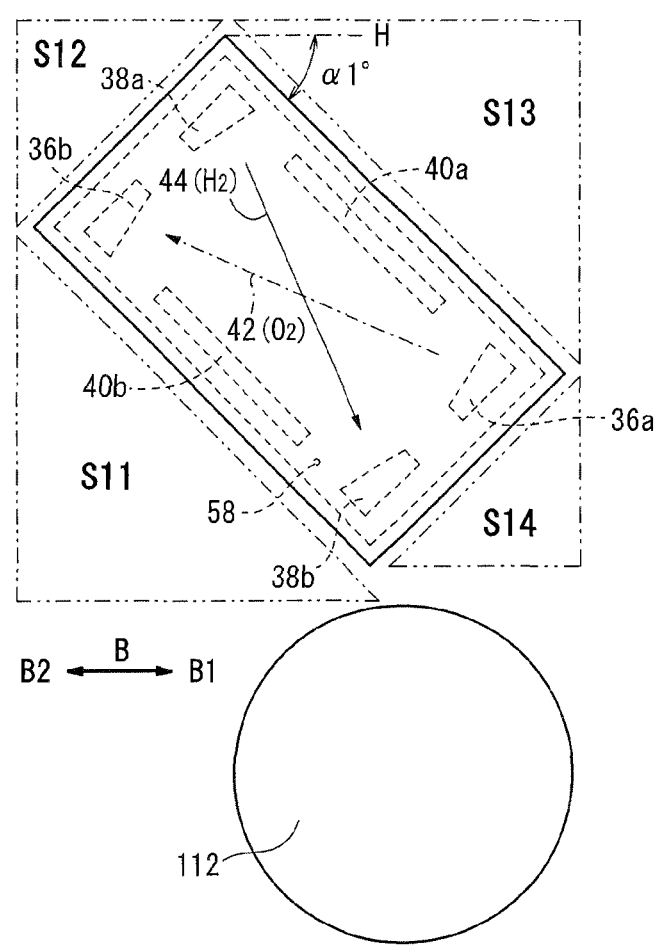
FIG. 14 is a view showing spaces for providing the fuel cell system.

As shown in FIG. 14, the rear end of the long side of the fuel cell stack 122 is inclined downward to the back in the vehicle length direction indicated by the arrow B1. In the structure, spaces S11, S12, S13, and S14 are provided around the fuel cell stack 122.

The space S11 is an area in front of the fuel cell stack 122. Devices for the air supply system such as the humidifier 72 and the solenoid valve 96 may be provided in the space S11. The space S12 is an upper area in front of the fuel cell stack 122. For example, the space S12 functions as a crash space for providing clearance with a bonnet.

Further, the space S13 is an upper area on the back side of the fuel cell stack 122. For example, devices as electrical components and systems such as the ECU 98 may be provided in the space S13. The space S14 is a lower area on the back side of the fuel cell stack 14. For example, devices for the hydrogen system such as the gas liquid separator 86 and the ejector 82 may be provided in the space S14.

Figure 15:
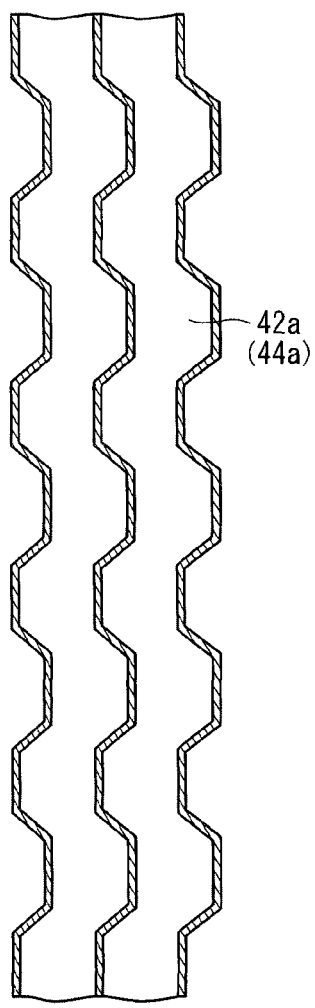
FIG. 15 is a view showing another type of corrugated flow grooves.
Figure 16:
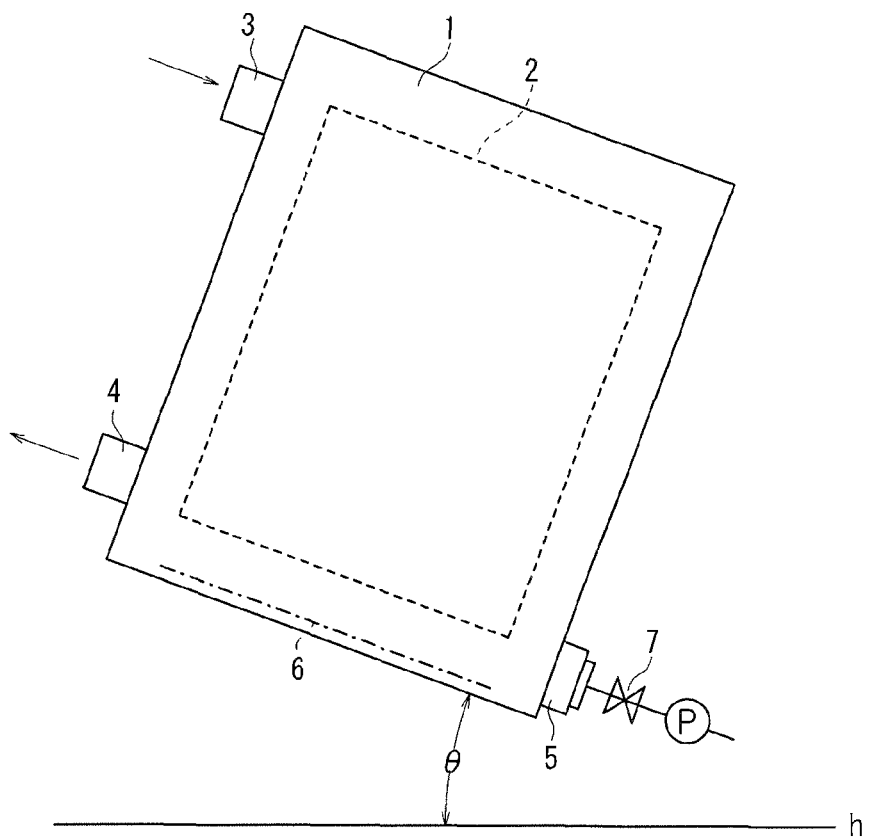
FIG. 16 is a view showing a fuel cell disclosed in Japanese Laid-Open Patent Publication No. 2003-092130.

As shown in FIGS. 3 and 12, the corrugated flow grooves 42a, 44a are curved continuously. However, the present invention is not limited in this respect. For example, as shown in FIG. 15, the corrugated flow grooves 42a, 44a may be formed to including straight portions and portions curved in different directions (in a front view, continuous trapezoidal shape). Further, straight flow grooves may be used instead of the corrugated flow grooves 42a, 44a.

In the second embodiment, the fuel gas supply passage 38a is provided in the uppermost position in the direction of gravity, and the fuel gas discharge passage 38b is provided in the lowermost position in the direction of gravity. Therefore, the condensed water remaining in the fuel gas flow field 44 flows smoothly and reliably from the inlet side to the outlet side by inclination of the fuel gas flow field 44. Further improvement in the performance of discharging the water is achieved advantageously.

Further, the same advantages as in the case of the first embodiment are obtained. For example, in the front box 18 of the fuel cell vehicle 12, peripheral devices can be laid out in the compact spaces efficiently.

While the invention has been particularly shown and described with reference to the preferred embodiments, it will be understood that variations and modifications can be effected thereto by those skilled in the art without departing from the spirit of the invention as defined by the appended claims.

What is claimed is:

1. A fuel cell system including a fuel cell stack and a mounting section, the fuel cell stack being formed by stacking a plurality of fuel cells, the fuel cells each including a membrane electrode assembly and a pair of separators sandwiching the membrane electrode assembly, the membrane electrode assembly including a pair of electrodes and an electrolyte membrane interposed between the electrodes, a fuel gas flow field being formed between one of the electrodes and one of the separators for supplying a fuel gas along an electrode surface, an oxygen-containing gas flow field being formed between the other of the electrodes and the other of the separators for supplying an oxygen-containing gas along an electrode surface, the fuel gas in the fuel gas flow field and the oxygen-containing gas in the oxygen-containing gas flow field flowing in a counterflow manner, the mounting section being provided in a front box of a vehicle for mounting the fuel cell stack in a state where an inlet side of the fuel gas flow field is positioned above an outlet side of the fuel gas flow field with respect to a fuel gas flow direction such that the fuel cell stack is inclined downward in the direction of the fuel gas flow toward a back of the vehicle in a vehicle length direction, wherein:

the fuel gas flows in the fuel gas flow field from the inlet side to the outlet side, in only one direction without any turnover, and an inlet side of the oxygen-containing gas flow field is positioned below an outlet side of the oxygen-containing gas flow field with respect to the direction of the fuel gas flow when the fuel cell system is mounted in the vehicle, and wherein a water drainage passage extends through the inlet side of the oxygen-containing gas flow field in the stacking direction of the fuel cells, wherein the water drainage passage is connected to a drainage pipe extending to an outside of the fuel cell stack, and wherein the water drainage passage is separate and distinct from an oxygen-containing gas supply passage that extends through the separators for supplying the oxygen-containing gas and from a fuel gas discharge passage extending through the separators for discharging the fuel gas, wherein an inlet buffer region is formed at an inlet of the oxygen-containing gas flow field, and wherein the water drainage passage is formed in the inlet buffer region.

2. The fuel cell system according to claim 1, wherein an open/close valve is disposed in the drainage pipe.

3. The fuel cell system according to claim 1, further comprising means for detecting an amount of condensed water retained in the water drainage passage.

4. The fuel cell system according to claim 1, wherein a plurality of the fuel cells are stacked together in a vertical direction in a state where the electrode surfaces are oriented in a horizontal direction corresponding to the fuel gas flow direction.

5. The fuel cell system according to claim 1, wherein the fuel cells are stacked in a horizontal direction corresponding to the fuel gas flow direction in a state where the electrode surfaces are oriented in a vertical direction.

6. The fuel cell system according to claim 5, wherein the fuel gas flow field includes a plurality of corrugated flow grooves; and all of flow directions of the fuel gas along central lines of the corrugated flow grooves are inclined downward from the horizontal direction.

7. The fuel cell system according to claim 1, wherein the water drainage passage directly communicates with the fuel gas flow field and with the oxygen-containing gas flow field.

* * * * *